No. 826,697. PATENTED JULY 24, 1906.
W. C. STEWART.
MACHINE FOR MOLDING COUNTERS.
APPLICATION FILED APR. 5, 1905.
7 SHEETS—SHEET 1.
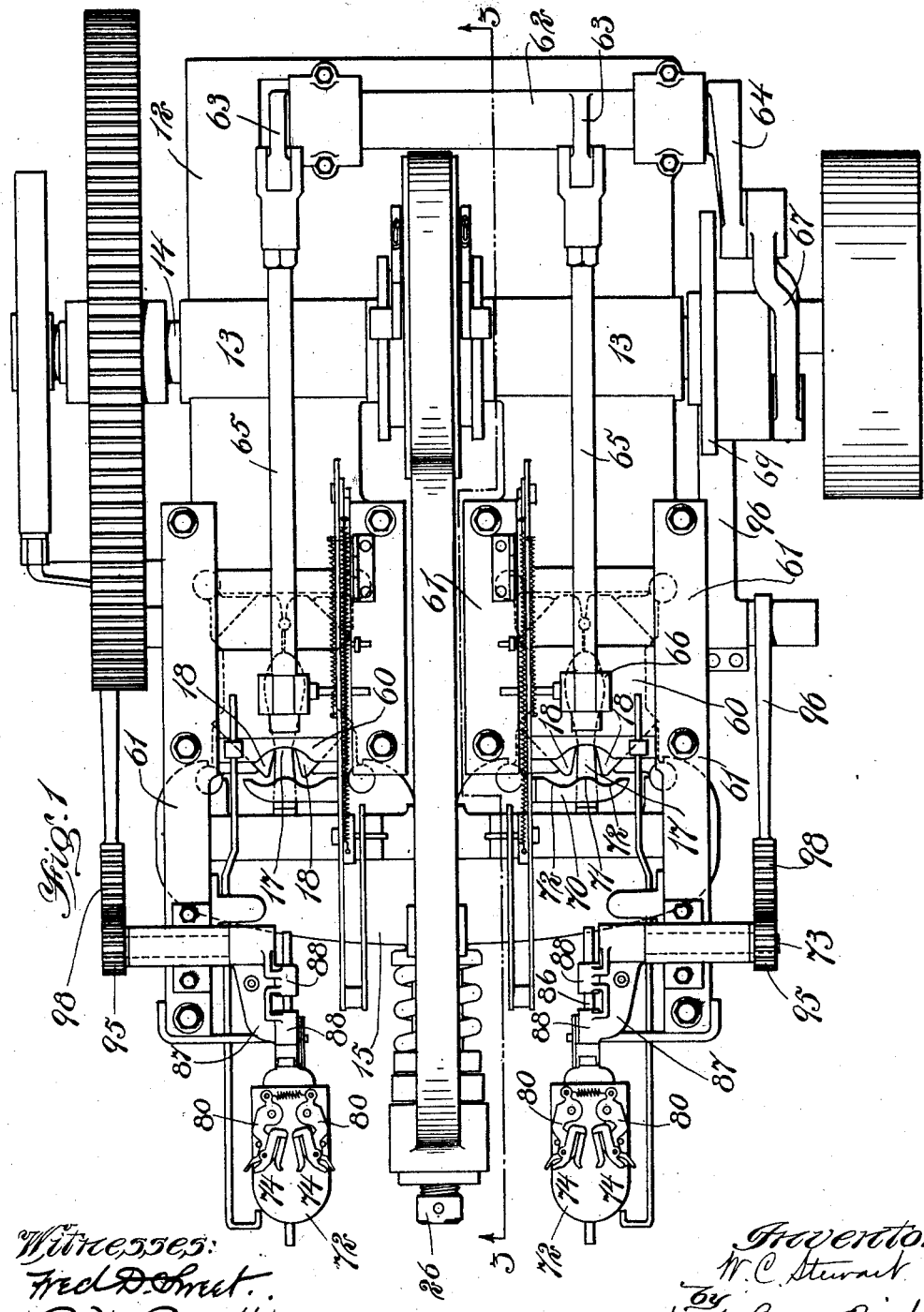

No. 826,697. PATENTED JULY 24, 1906.
W. C. STEWART.
MACHINE FOR MOLDING COUNTERS.
APPLICATION FILED APR. 5, 1905.
7 SHEETS—SHEET 2.
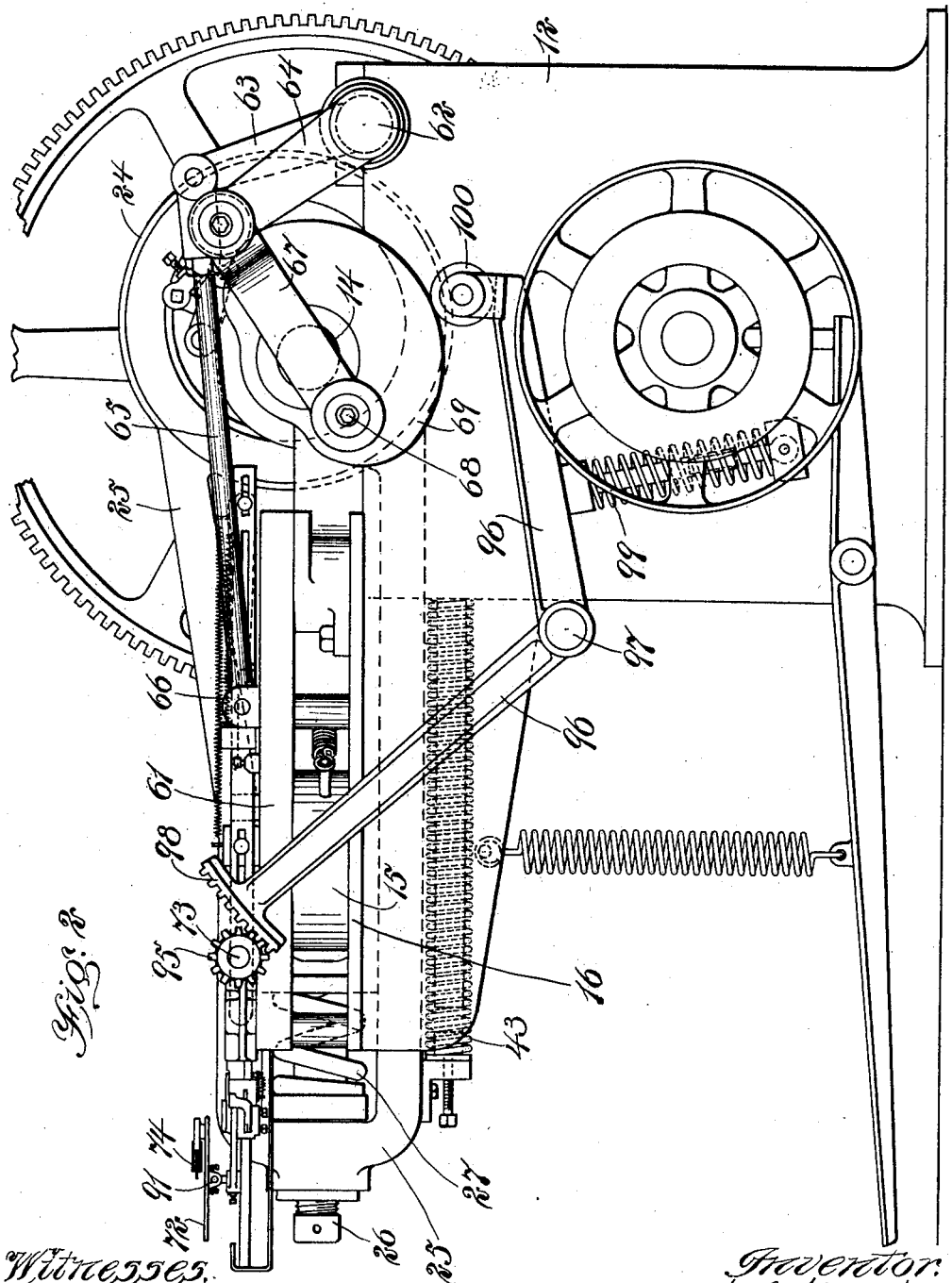

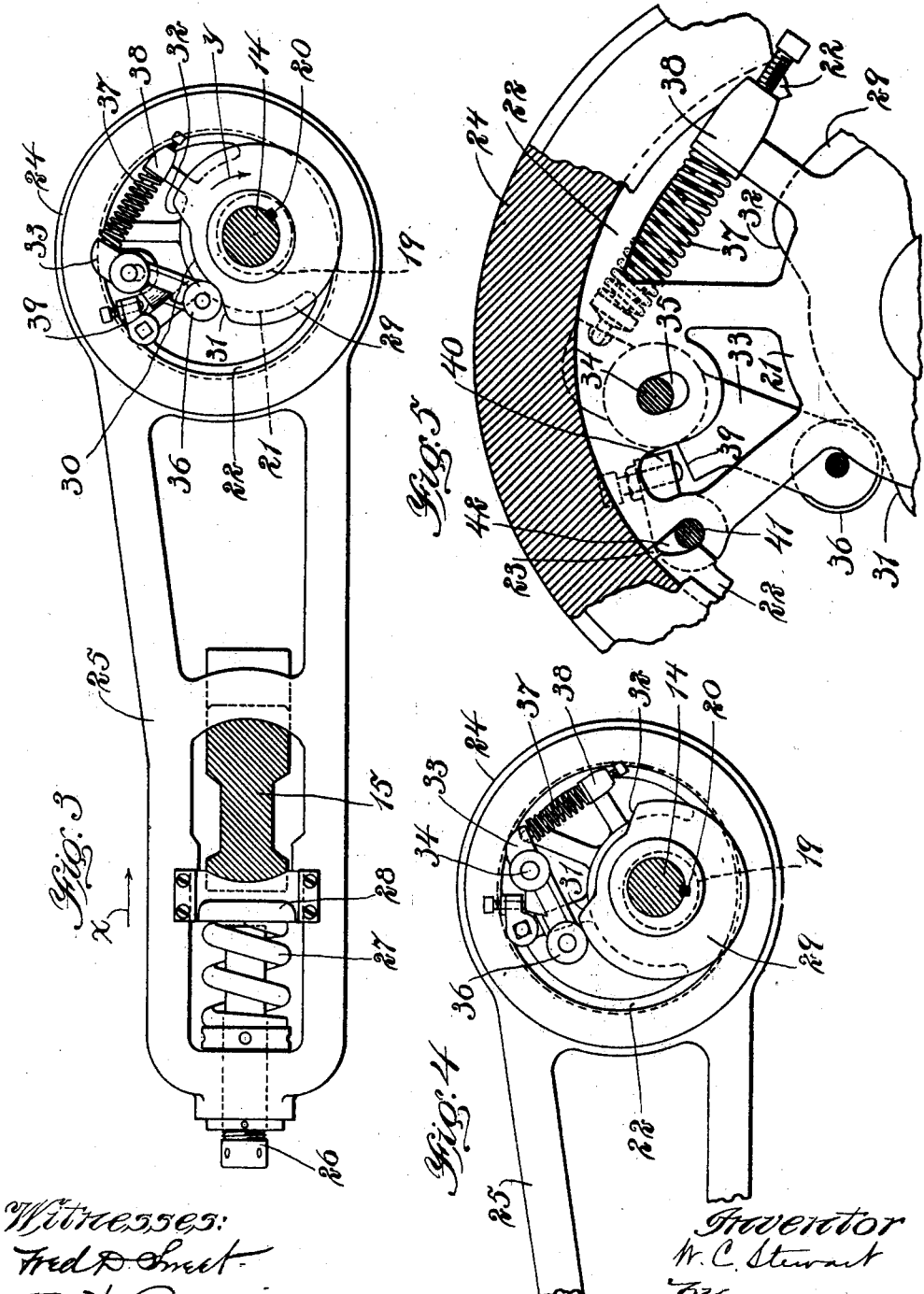

No. 826,697. PATENTED JULY 24, 1906.
W. C. STEWART.
MACHINE FOR MOLDING COUNTERS.
APPLICATION FILED APR. 5, 1905.
7 SHEETS—SHEET 4.
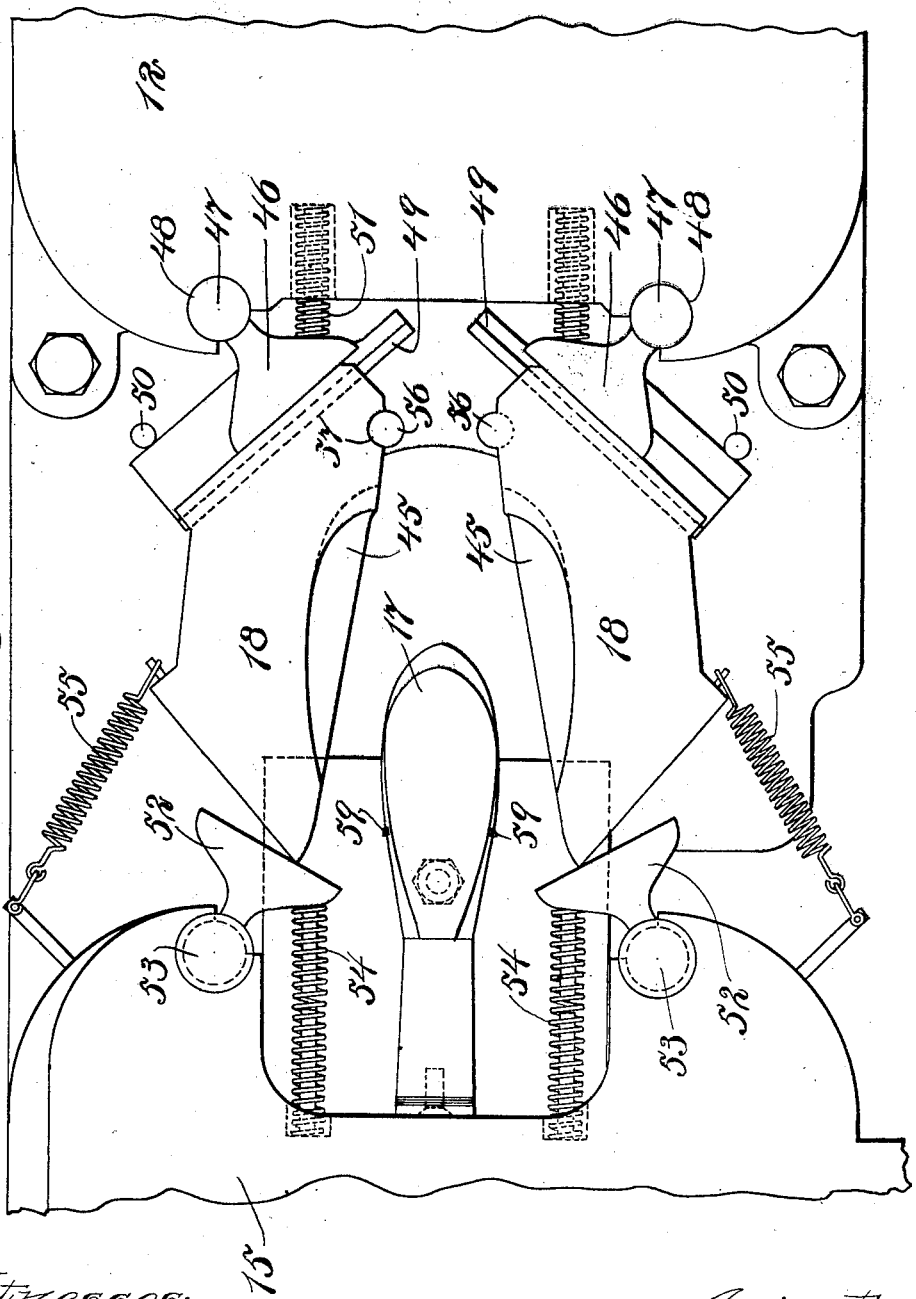

No. 826,697. PATENTED JULY 24, 1906.
W. C. STEWART.
MACHINE FOR MOLDING COUNTERS.
APPLICATION FILED APR. 5, 1905.
7 SHEETS—SHEET 5.
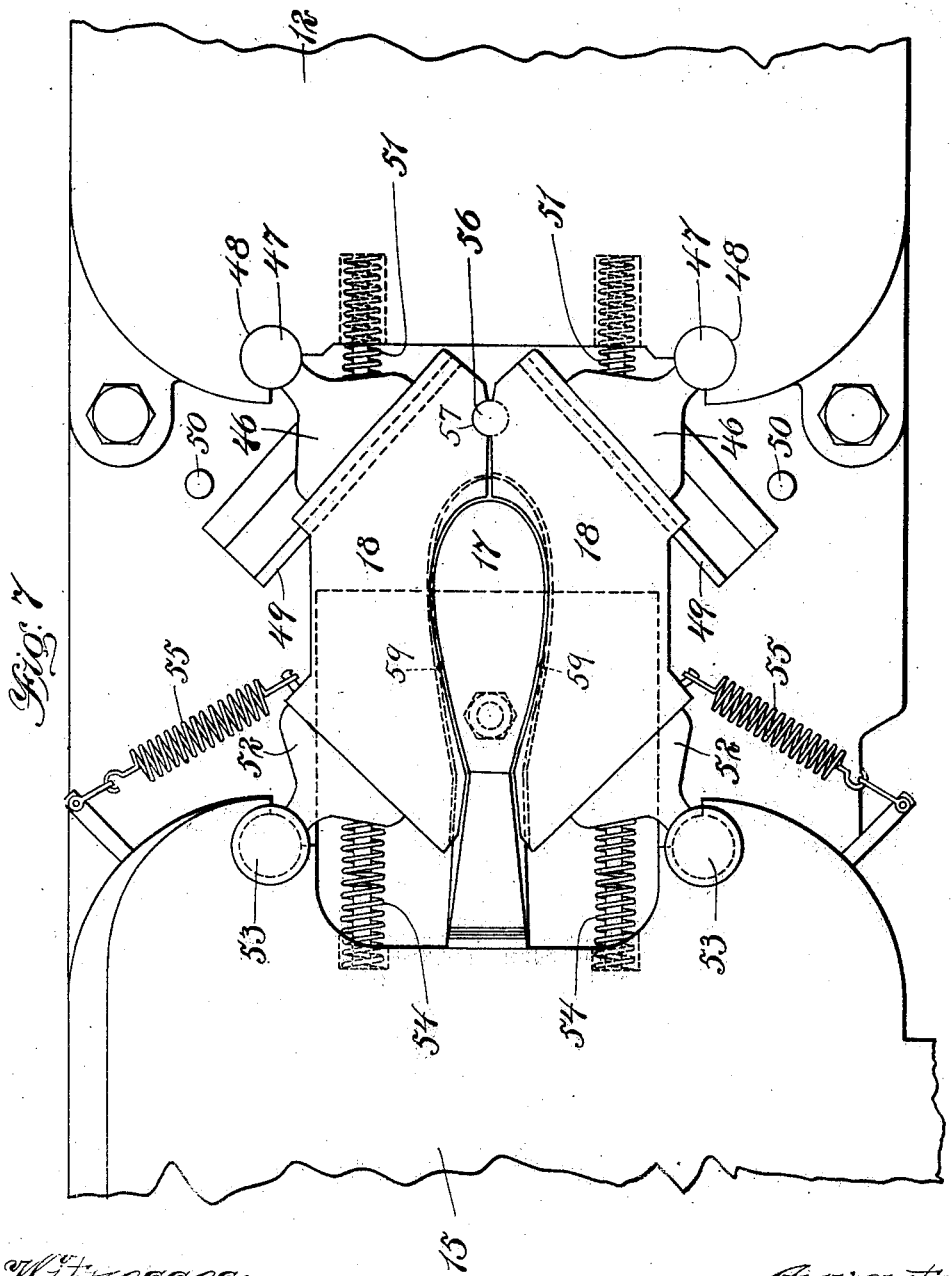

No. 826,697. PATENTED JULY 24, 1906.
W. C. STEWART.
MACHINE FOR MOLDING COUNTERS.
APPLICATION FILED APR. 5, 1905.
7 SHEETS—SHEET 6.
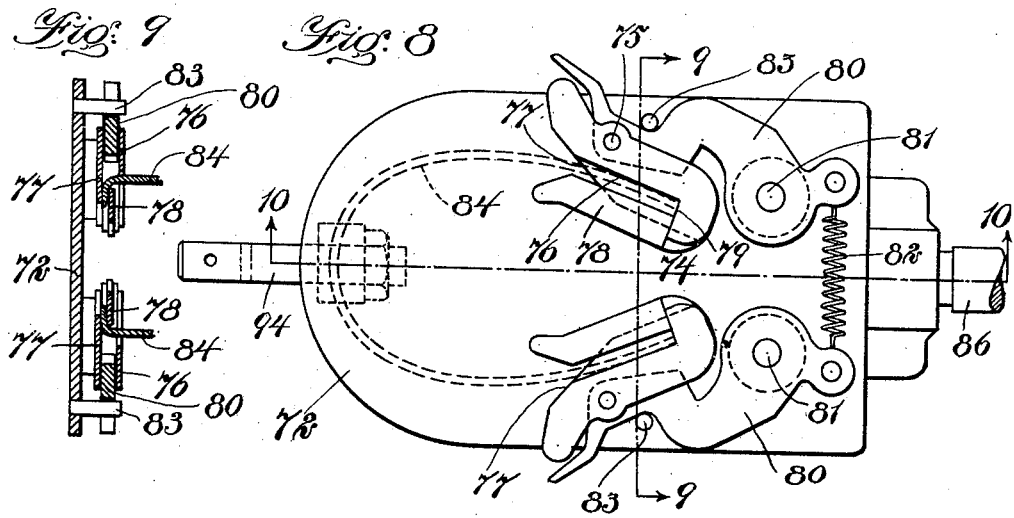
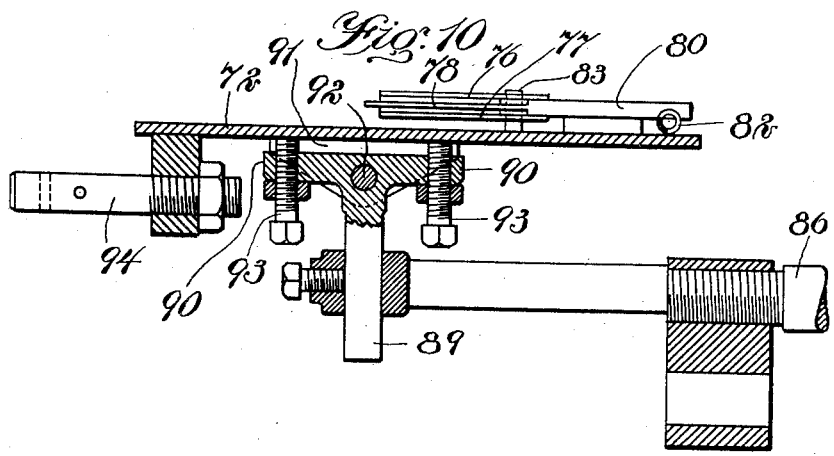
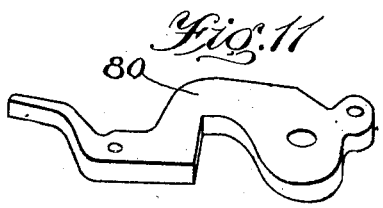
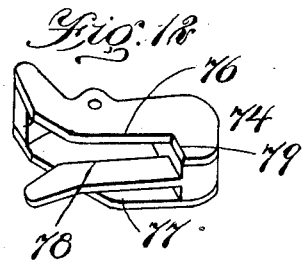
Witnesses:
Fred D. Smith
P. W. Pezzetti
Inventor.
W. C. Stewart
by
Wright Brown Quinby
Attorneys.

No. 826,697. PATENTED JULY 24, 1906.
W. C. STEWART.
MACHINE FOR MOLDING COUNTERS.
APPLICATION FILED APR. 5, 1905.

7 SHEETS—SHEET 7.

Witnesses:
L. E. Kennedy
E. F. Batchelder

Inventor
W. C. Stewart
by
Wright, Brown & Quinby
Attorneys

UNITED STATES PATENT OFFICE.

WILLIAM C. STEWART, OF LYNN, MASSACHUSETTS, ASSIGNOR TO GARDINER, BEARDSLEY AND COMPANY, OF NASHUA, NEW HAMPSHIRE, A FIRM.

MACHINE FOR MOLDING COUNTERS.

No. 826,697. Specification of Letters Patent. Patented July 24, 1906.

Application filed April 5, 1905. Serial No. 253,990.

*To all whom it may concern:*

Be it known that I, WILLIAM C. STEWART, of Lynn, in the county of Essex and State of Massachusetts, have invented certain new and useful Improvements in Machines for Molding Counters, &c., of which the following is a specification.

This invention relates to machines for pressing between opposed molds or dies articles of leather or like material which is conformable to pressure, such as heel-stiffeners or counters for boots and shoes.

While the invention is here shown as embodied in a counter-molding machine, it is to be understood that portions thereof, and particularly those which relate to means for forcing a movable mold or die toward a fixed mold or die, first yieldingly until the dies are brought to a pressing relation with the interposed material or blank, without regard to the thickness of the latter, and are then caused to act positively to exert the desired forming pressure on the material, may be embodied in machines for pressing or molding soles and other parts of boots and shoes, &c.

Figure 13:
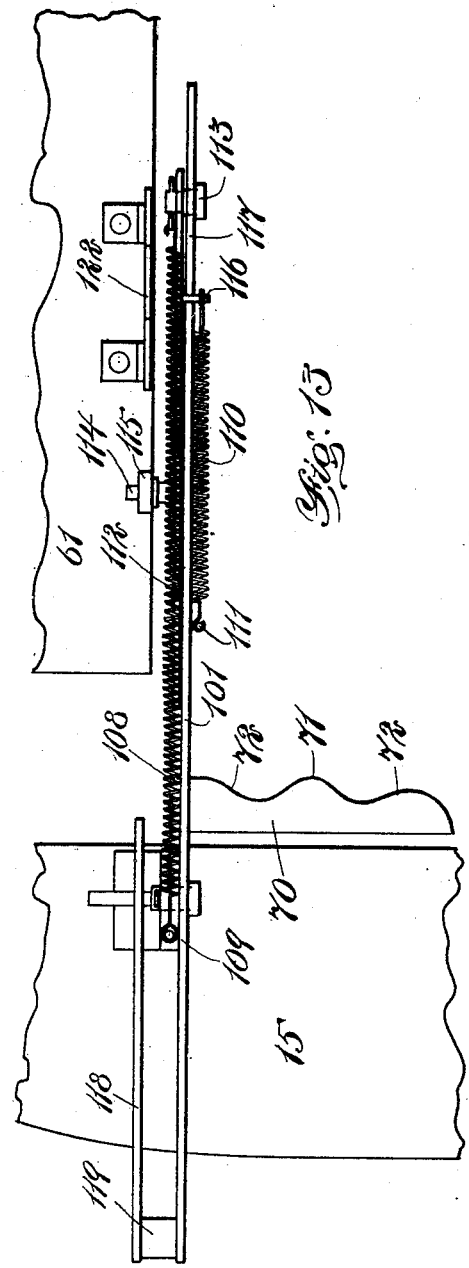
Figure 14:
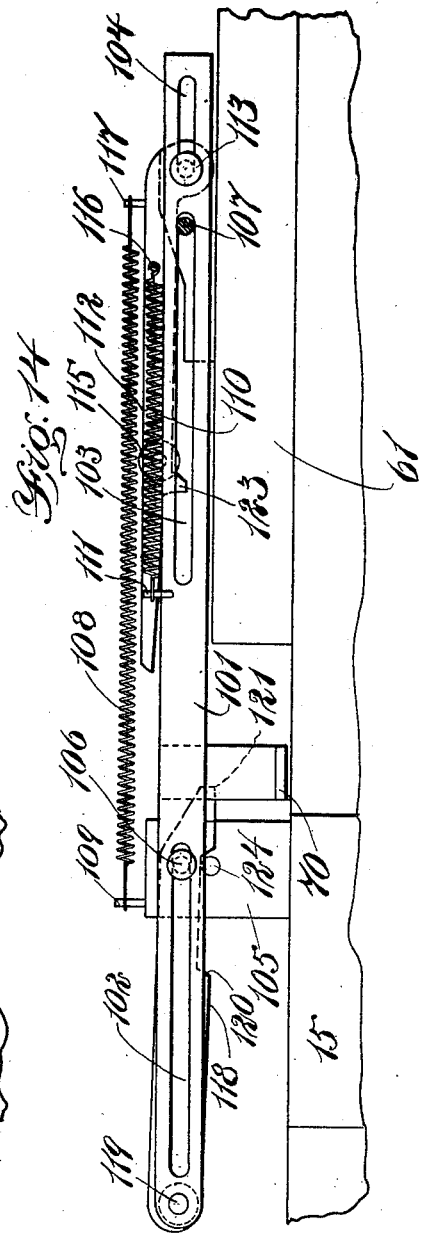

The invention consists in the several improvements hereinafter described, and particularly pointed out in the appended claims.
Of the accompanying drawings, forming a part of this specification, Figure 1 represents a top plan view of a counter-molding machine embodying the invention. Fig. 2 represents a side elevation of the same. Fig. 3 represents a section on line 3 3 of Fig. 1. Fig. 4 represents a section similar to a portion of Fig. 3, showing a different stage of the operation. Fig. 5 represents an enlargement of a portion of Fig. 3, certain parts shown in elevation in Fig. 3 being shown in section. Fig. 6 represents an enlarged plan view of the male and female molds shown in Fig. 1, the parts shown above said molds in Fig. 1 being omitted and the molds being shown in their open position. Fig. 7 represents a view similar to Fig. 6, showing the molds closed. Fig. 8 represents a top plan view of one of the blank-feeding devices. Fig. 9 represents a section on line 9 9, Fig. 8. Fig. 10 represents a section on line 10 10, Fig. 8. Figs. 11 and 12 represent detached perspective views of the blank-engaging devices shown in Fig. 8. Fig. 13 is a detail plan view of the mechanism for projecting and retracting the ejector. Fig. 14 is an elevation of the parts shown in Fig. 13.

The same reference characters indicate the same parts in all the figures.

In the drawings, 12 represents the frame of the machine, having fixed bearings 13 13, in which the main operating-shaft 14 is journaled.

15 represents a cross-head which is movable in guides 16 16, affixed to the frame of the machine. To said cross-head is affixed a male mold or former 17, which is moved by the mechanism hereinafter described toward and from the female mold, which is composed of two sections 18 18, loosely connected, as hereinafter described, with the fixed frame of the machine, the said female-mold sections in this embodiment of my invention being adapted both to oscillate and to move rectilinearly.

As shown in Fig. 1, the invention is embodied in a twin machine having two male molds, two female molds, and operating mechanism causing the molding of two counters during each cycle of movement of the machine. A description of one set of molds and the operating mechanism employed therewith will be understood as applying to the entire organization shown in Fig. 1.

19 represents an eccentric affixed rigidly by a key 20 to the shaft 14, this part being hereinafter referred to as the "inner" eccentric. On said inner eccentric is mounted loosely an outer eccentric 22, having a hub 21 fitted to turn upon the inner eccentric, the outer eccentric being eccentric to the hub and to the inner eccentric. The outer eccentric is divided at 23 to enable it to be expanded and contracted, as hereinafter described, and thus alternately engaged with and disengaged from a ring or strap 24, which surrounds the outer eccentric. Said ring is formed on a rod or yoke 25, which is engaged with the cross-head 15 in such manner as to impart motion thereto in the direction of the arrow $x$ in Fig. 3, the engagement between the eccentric-rod and the cross-head being in this case partially yielding and effected by means of a stud 26, adjustably affixed to the rod 25, and a spring 27, mounted on the stud and bearing on a block 28, interposed between the spring and the cross-head. Movement of the rod 25 in the direction indicated applies pressure to the cross-head, first yieldingly through the spring 27 and then positively through the stud 26 and block 28, the stud bearing on the block. These details of mechanism for imparting movement from the eccentric-rod to the cross-head while useful in a counter-molding machine may be dispensed with and other means, omitting the spring-pressure, substituted therefor.

29 represents a cam affixed by the key 20 to the shaft 14, the perimeter of said cam having a recess 30 and inclined cam portions 31 32.

33 represents a lever having a fulcrum 34 located in a slot 35 in the outer eccentric, one arm of said lever having a trundle-roll 36, which rides on the perimeter of the cam 29.

37 represents a spring which is interposed between the other arm of the lever 33 and a bearing 38, affixed to the outer eccentric. When the cross-head 15 is moving forward and before the molds carried thereby come to a bearing on the work and press the latter against the female mold, the parts occupy the relative positions shown in Fig. 3, the cam portion 31 engaging the lever 33 and exerting pressure through said lever and the spring 37 on the outer eccentric, thus rotating the latter on the inner eccentric. This action continues until the male mold has come to a bearing on the blank and the latter has been pressed by the male mold against the female mold. The spring 37 then yields and permits the cam portion 31 to force the inner end of the lever 33 outwardly, as shown in Fig. 4. This movement of the lever causes a shoulder 39 thereon to strike a stud carried by an arm 40 on a rock-shaft 41, journaled in the outer eccentric at the point where the latter is divided, the rock-shaft being thus partially turned.

The rock-shaft carries a cam-shaped arm 42, which is caused by the turning of the rock-shaft to bear on one of the sides of the division or opening in the outer eccentric 22, thus expanding the latter and causing it to positively engage the inner surface of the ring 24. The said ring and the outer eccentric thus become, in effect, one part, so that they constitute a two-part eccentric ring or strap connecting the rod 25 and the cross-head with the inner eccentric 19, the continued rotation of which now imparts a positive movement through the said two-part ring or strap to the cross-head. The arrangement of the inner eccentric is such that its rotation does not move the outer eccentric in the direction required to move the cross-head in the direction of the arrow $x$ until the outer eccentric has been locked to the ring 24. The extent of the said positive movement caused by the locking of the outer eccentric to the ring is determined by the form of the inner eccentric and is sufficient to give the desired positive pressure to the work between the male and female dies. The outer eccentric and ring remain locked together until the cam portion 32 reaches the lever 33, the spring 37 then acting to return the lever to the position shown in Fig. 3, so that the cam-arm 42 releases the outer eccentric, which contracts out of locking engagement with the ring 34. When the cam portion 31 again reaches the lever 33, it acts as before, through said lever and the spring 37, to rotate the outer eccentric on the inner eccentric until the molds are both in operative contact with the work, when the eccentric and ring are again locked together.

It will be seen from the foregoing that I have made provision for initially imparting a yielding forward movement to the cross-head to bring the molds into operative contact with the work and for then imparting a positive forward movement to the cross-head to effect the desired pressure, the extent of the yielding forward movement being determined by the thickness of the work. After the positive pressure has been applied and while the inner eccentric is moving backwardly a spring 43 retracts the cross-head and male mold and restores the parts to the position shown in Fig. 3.

The above-described mechanism may be employed to move a movable mold or die toward a fixed mold or die in a sole-molding or other analogous machine and may be embodied in a machine in which the movable mold moves vertically, in which case the spring 43 will not be required, the movable die being retracted by gravitation.

The female mold-sections 18 are provided at their opposed inner sides with forming-faces 45, adapted to the exterior of a counter, the male mold 17 being correspondingly formed. The sections 18 are slidingly connected at their inner ends with swinging guide-pieces 46, having hinge members 47 engaging complemental hinge members 48 on the frame 12. The guide-pieces 46 have guide-ribs 49, which engage grooves in the inner ends of the mold-sections 18. The guide-pieces are supported at the outer extremes of their swinging movement by fixed stops 50, against which the guide-pieces are held by springs 51. Said stops and springs cause the guides 49 to stand, preferably, at an angle of forty-five degrees to the path of movement of the male mold.

52 52 represent swinging pressure-blocks hinged at 53 to the cross-head 15 and pressed by springs 54 against the oblique outer ends of the mold-sections 18, the latter being held yieldingly against the pressure-blocks and moved outwardly in the guide-ribs 49 by springs 55.

At the commencement of the operation the mold-sections 18 are separated, as shown in Fig. 6, there being a wide space between them for the escape of a previously-formed counter. When the cross-head advances, the pressure-blocks 52 force the sections 18 in the same direction and cause them to slide obliquely on the guides 49, which are at this time prevented from swinging inwardly by the springs 51. This action continues until two offset bosses or projecting hinge members 56 on the sections 18 enter corresponding recessed hinge members 57 in said sections and establish a hinge connection between the sections, so that continuation of the movement of the cross-head causes the outer ends of the sections 18 to swing inwardly and close upon the male mold, as shown in Fig. 7, when the male mold reaches the forward extreme of its movement. The completion of the forward movement of the male mold presses the heel portion of the counter and causes an additional closing movement of the sections 18, thus pressing the sides of the counter. At the same time the sides of the counter are forced onto the spurs 59, with which the sides of the male mold are provided. The spurs are formed to engage the side portions of the counter in such manner that the retraction of the male mold will pull the counter from the female-mold sections and prevent it from adhering thereto. When the male mold commences to retract, the sections 18 remain closed until the male-mold spurs have drawn the heel portion of the counter from the heel portion of the female mold, after which the sections 18 are forced diagonally outward by the combined action of the springs 51 and 55 to the position shown in Fig. 6. It will be seen that the combined swinging and rectilinear sliding movements of the mold-sections 18 insure a wide separation of said sections and an ample opening between said sections and the male mold for the escape of the counter when the same is knocked from the male mold by the ejector hereinafter described.

60 represents the flange wiper or former, which is a plate movable in such proximity to the upper surfaces of the molds as to engage the edge of the blank which projects above the molds and wipe the same over the top of the male mold, as usual in machines of this character. The flange-former is movable in guides 61 on the frame of the machine and is reciprocated by suitable connections with the shaft 14, said connections, as here shown, comprising a rock-shaft 62, journaled in fixed bearings and having arms 63 64, a rod 65, connecting the arm 63 with ears 66 on the flange-former, and a rod or link 67, connecting the arm 64 with an eccentric wrist-pin 68 on a cam 69, affixed to the shaft 14, said cam in this embodiment of the invention being a part of the mechanism which operates the counter-feeding device hereinafter described. The flange-former is moved forward to form the counter-flange, while the molds are closed on the body of the counter, and is then retracted to permit the removal of the counter by the ejector hereinafter described.

70 represents a counter-ejector, which is a finger movable over the upper surface of the male mold and in such close proximity thereto as to engage the ends of the flange portions of the counter and force the latter toward the heel end of the male mold. During the pressing and flange-forming operations the ejector occupies a retracted position at the rear of the male mold, as shown in Fig. 1. After the molds have separated and the male mold has retreated, carrying with it the completed counter, the ejector is projected toward the heel end of the male mold until a curved projection 71 on its forward edge strikes the end portions of the counter, said projection being formed to force the side portions of the counter outwardly and disengage them from the spurs 59 on the male mold. The ejector at the same time forces the counter toward the heel end of the male mold and causes it to fall through the opening between the separated male and female molds. The ejector is then returned to its retracted position, suitable means being employed for holding it in said position and for projecting and retracting it.

The present invention, so far as the ejector is concerned, resides in the projection 71, which forces the sides of the counter outwardly from the spurs 59, and any suitable mechanism may be employed for projecting and retracting the ejector and holding it in its retracted position. Additional projections 72 72 at opposite ends of the projections 71 limit the outward or spreading movement of the counter sides by the projection 71.

The mechanism which I prefer to employ for projecting and retracting the ejector is best illustrated in Figs. 13 and 14 in connection with Fig. 1. The ejector 70 is integral with or attached to a slide-bar 101, said bar being formed with slots 102, 103, and 104. Rising from the cross-head 15 is an upright 105, having a pin 106 entering the slot 102 to guide one end of said bar in its reciprocatory movements. The other end of said bar is supported upon a pin 107, projecting from the ears 66 of the wiper. In the following description of the construction and operation of the details of this mechanism it is to be borne in mind that the cross-head 15 and the wiper 60 have relative movements which need not be mentioned in detail. A spring 108 is connected at one end to a pin 109, projecting from the upright 105, and another spring 110, relatively shorter and stronger than the spring 108, is secured at 111 to the slide-bar 101. A latch 112 is provided with a pivot-stud 113, mounted in the slot 104 of the slide-bar, so that said latch may have a slight movement longitudinally of the said slide-bar. Said latch is provided with a stud 114, on which is mounted a roll 115, the purpose of which will be presently described. The latch is provided with a pin 116, to which one end of the spring 110 is connected, and with another pin 117, to which one end of the spring 108 is connected. To the other end of the slide-bar a latch 118 is pivoted at 119, said latch being provided with a recess in its lower edge, near the free end thereof, said recess having a shoulder 120. The toe 121 of the latch 118 is adapted to abut the guide 61, which is a fixed member, as will be presently described. On said guide a cam-plate 122 is mounted to coact with the roll 115 to trip the latch 112. The latch 112 is provided with a toe 123. The upright 105 is provided with a pin 124. The operation of this mechanism is as follows: The first closing movement of the cross-head 15 causes the pin 106, by engaging the end of the slot 102, to advance the slide-bar and the parts connected therewith, such advance movement being toward the right from the positions shown in Figs. 13 and 14.
The movement of the wiper toward the left carries the pin 107, which projects from the ears of the wiper, to a point where it engages the toe 123 of the latch 112, lifts said latch, and as it continues to move along the slot 103 passes the toe and permits the latch to drop. On the next movement (toward the right) said pin 107 engages the upright side of the toe 123 and moves said latch and the slide-bar (through the medium of the relatively strong spring 110) until the toe 121 of the latch 118 is stopped by contact with the end of the fixed guide 61. Continued movement in the same direction expands both springs and shifts the fulcrum or pivot 113 toward the other end of the slot 104. During this movement the ejector 70 is held in a position adjacent to the turned edge of the counter. The next operation of the machine moves the cross-head 15 to the left and the molds open, but the ejector, of course, remains in the same position. This movement will carry the pin 124 to position to engage the shoulder 120 of the latch 118 and lift said latch, so that its toe 121 will clear the end of the guide 61. This releases the slide-bar, so that the spring 110 shifts the slide, and the ejector releases the counter from the male mold and throws it free, so that it may drop into a suitable receptacle. The continued retreat of the wiper causes the pin 107, which is still in engagement with the toe 123, to carry the latch 112 and the ejector-slide toward the right until the roll 115, riding up the cam 122, lifts the toe 123 clear of the pin 107, and then the long spring 108 restores the parts to the position shown in Figs. 13 and 14.

A carrier is provided for transferring a counter-blank from the attendant's station at the front of the machine to the opening between the dies and for holding the body of the counter between the dies in such position that the dies will close properly on said body. The carrier is adapted to engage the portion of the blank which projects above the molds and subsequently forms the flange, the carrier being preferably adapted to engage the ends of said portion. As here shown, the carrier comprises a flat plate or bed 72, mounted on the swinging end of an arm which is affixed to a rock-shaft 73, which is journaled in fixed bearings and rocked to oscillate the arm and hold the plate 72 alternately projected from the machine to receive a blank and in position over the dies to hold the blank between the dies.

The preferred counter-engaging means comprise members 74, pivoted at 75 to supports 80, hereinafter described, each member having a blank-receiving throat, preferably composed of a pair of fingers 76 77, forming one side of the throat, and a finger 78, rigidly connected with the fingers 76 77 and forming the opposite side of the throat, as shown clearly in Figs. 8, 9, and 12. A stop-shoulder 79 at the inner end of the throat limits the insertion of the ends of the blank into the throat. The supports 80 are arms pivoted at 81 to the plate 72 and normally held by a spring 82, connecting said arms against stops 83, affixed to the plate 72. The members 74 are therefore adapted to swing toward and from each other in a plane parallel with the plate 72. The fingers 76, 77, and 78 are so arranged relatively to each other that the end of a blank 84 inserted in said throat will be supported at one side by the fingers 76 and 77 and at the other side by the finger 78, the blank being bent over the edge of the finger 78, as shown in Fig. 9. This bending of the blank causes its firm frictional engagement with the fingers, so that there is no liability of displacement when the carrier is moved to locate the blank between the dies. The freedom of movement of the members 74 afforded by the pivotal connection of said members with the arms 80 and by the pivotal connection of said arms with the plate 72 enables the said members to engage and hold blanks of various lengths and sizes. The engaging members are enabled by the pivoted arms 80 to swing laterally or crosswise of the male mold, so that the bent blank can be deflected in either direction laterally by contact with the male mold when the carrier is moving to its blank-presenting position. In practice the operator grasps the end portions of the blank, bends it, and pushes its ends into the throats of the members 74 74 until the ends of the blank abut against the shoulders 79, the blank being by this operation bent over the fingers 78, as shown in Fig. 9. The arm which connects the plate 72 with the rock-shaft 73 is telescopic, so that it may be lengthened and shortened, thus permitting the plate 72 and the blank-engaging members thereon to be moved toward the heel portion of the female mold by the advance of the male mold and causing the blank-engaging members and the blank to advance with the male mold until the blank bears on the female mold. The telescopic construction of said arm also permits the said plate and blank-engaging members to be moved backward from the closed molds by the advance of the flange-former, the blank-engaging members being thus detached from the blank just before the flange is wiped down by the flange-former. The said telescopic arm comprises a section 86, rigidly connected with the plate 72, and a section 87, rigidly connected with the rock-shaft 73. The section 87 is provided with guides 88, in which the section 86 is longitudinally movable in either direction to vary the length of the arm and permit the described longitudinal movement of the carrier, whereby the carrier will follow the movements of the blank in the molds. The arm-section 86 is connected with the plate 72 by means of a stud 89, having arms 90, ears 91, attached to the plate 72, and a pivot 92, connecting the ears 91 with the stud. Bearing-screws 93, adjustably engaged with the arms 90, abut against the plate 72 and permit the latter to stand either parallel with the arm or at an inclination thereto.

94 represents a stud attached to the plate 72 in position to encounter the flange-former 60 when the carrier is positioned over the molds, the flange-former by its contact with the stud 94 pushing the carrier back and out of engagement with the counter.

The means for rocking the rock-shaft 73 and oscillating the carrier comprise a gear 95, affixed to the rock-shaft, a lever 96, pivoted at 97 to the machine-frame, one arm of said lever having a gear-segment 98, engaging the gear 95, the cam 69 on the operating-shaft 14, and a spring 99, arranged to hold a trundle-roll 100 on the other arm of the lever 96 against the cam 69.

Operation: The cross-head 15 being retracted, the molds separated, and the counter-carrier held in its receiving position at the front of the machine, the operator engages the ends of a blank with the carrier members 74. The carrier is then swung to position over the molds and inserts the body of the blank between the molds. The male mold then advances, engages the blank, and forces it toward the heel portion of the female mold, the telescopic carrier-arm lengthening to permit the counter-engaging members 74 to be moved forward by the operation of the male mold acting through the counter itself as the temporary transmitter of the motion of the said mold to the carrier. Then as the edge of the counter bends backward under the curving pressure when the two molds come together the carrier yields to such slight backward movement. The female mold closes on the advancing male mold until all parts of the mold-surfaces come to a bearing on the blank. The final positive pressure is then imparted by the inner eccentric 19, as described. The flange-former then advances and wipes down the flange and at the same time pushes back the counter-carrier out of engagement with the counter. The carrier then swings back to its counter-receiving position. The molds then separate, and the flange-former is retracted. Finally, the ejector moves forward, separates the sides of the counter to disengage them from the spurs of the male mold, and forces the counter from the male mold, so that it falls through the opening between the molds.

As is well known, counters vary considerably in thickness. To meet this difficulty without the use of springs for the entire molding operation, I have provided the eccentric mechanism above described, by which the actual or real molding operation is a positive or unyielding one. When the parts are in the position shown in Fig. 3, the inclined portion 31 of the cam 29 engages the roll 36 of the lever 33, but the spring 37 opposes the movement of said lever on its fulcrum. Therefore the cam 29 acts in a thrusting direction by the said lever, so as to carry around the outer eccentric as long as the resistance to the movement of the cross-head is not such as to result in the compression of the spring 37. As the counter yields the resistance to the movement of the cross-head 15 increases until finally the spring 37 permits the roll 36 of the lever to ride up onto the concentric portion of the cam 29, at which time the cam-shaped arm 42 is rocked, owing to the engagement of the shoulder 39 with the arm 40 of the rock-shaft 41. Such movement of the cam 42 locks the outer eccentric to the ring or eccentric-strap 24, so that the further movement of the cross-head and the molds becomes positive. Continued rotation of the shaft 14 carries the inner eccentric and the cam 29 around in the direction indicated by the arrow y in Fig. 3, causing the full power of the inner eccentric to act, through the rod 25 and the cross-head, to compress and form the counter; but when the cam 29 reaches a point to permit the roll 36 to drop into the recess 30 the lever 33 returns to a position which releases the cam-arm 42, and consequently releases the outer eccentric from the ring or eccentric-strap 24. At this point the spring 43 (see Fig. 2) acts to move the rod 25 toward the left, the said spring 43 being an expansion-spring, and the eccentric-strap or ring 24 pulls back on the outer eccentric, which is now free, to position for the next operation, the length of the recess 30 being sufficient to permit of this movement. As the coacting faces of the molds never consist of flat or straight surfaces, the portion of a counter which is engaged by the wiper is always moved or shifted relatively to the portions of the counter which are first engaged by the molds. For instance, the highest portions of the male mold engage portions of the counter and tend to deflect portions of the counter before said counter is firmly gripped by the molds themselves. In order to allow the edge of the counter to move or yield while still held by the carrier, the holding members of the carrier are mounted to swing freely toward and from each other on the carrier, as has been described, and the carrier itself is mounted to have a free in-and-out movement relatively to the arm which swings it. Counters also vary considerably in degrees of hardness and in size even when they are supposed to be the same, and it is therefore difficult to fit them to grippers or carrier members which hold them immovably while presented to the molds. The mounting of the counter-holding members so that they will have the freedom of movement hereinbefore described enables them to retain their hold of the counters regardless of the varying condition of the counters themselves and of the movements of the molds as said molds approach their final molding positions.

I do not limit myself to the details of mechanism shown and described and may variously modify the same without departing from the spirit of the invention. It is obvious that the counter-engaging members, movable by the advance of a movable mold to permit the engaging members to hold the blank until it is in position to receive its final pressure, may be used in a machine in which the male mold is fixed, the female mold having all the movements required to effect the desired pressure. It is also obvious that the operation of the sectional female mold and the means for opening and closing the same would be the same if the male mold were fixed, the movability being confined to the female mold.

The ring n, surrounding the outer eccentric, may be considered a clutch member, since it is frictionally locked to the outer eccentric by the expansion of the latter.

The cross-head or slide 15 is hereinafter referred to as a "mold-carrier."

Having thus explained the nature of my invention and described a way of constructing and using the same, although without having attempted to set forth all the forms in which it may be embodied or all the modes of its use, what I claim is—

1. In a molding or pressing machine, a mold or die carrier, an operating-shaft, and means operated by the rotation of said shaft and by resistance to the movement of the carrier for successively imparting yielding and positive movements from the shaft to the carrier.

2. In a molding or pressing machine, a mold or die carrier, an operating-shaft having an eccentric and a cam, both affixed to the shaft, and means for successively imparting forward movements from said cam and eccentric to the cross-head, said means having provisions for imparting a yielding movement from the cam, and a positive movement from the eccentric.

3. In a molding or pressing machine, a mold or die carrier, an operating-shaft having an eccentric and a cam, both affixed to the shaft, and connections between the shaft and carrier having means for imparting a yielding forward movement from the cam to the carrier, and means made operative by resistance to said forward movement, for imparting a positive forward movement from the eccentric to the carrier.

4. In a molding or pressing machine, a mold or die, a carrier therefor, an operating-shaft, an inner eccentric affixed to the shaft, an outer eccentric mounted to turn on the inner eccentric, connections between said outer eccentric and the carrier including a clutch member normally loose on the eccentric, and means operated by the rotation of the shaft for rotating the outer eccentric relatively to the clutch member and by resistance to the movement of the carrier for locking the outer eccentric to the clutch member, whereby yielding and positive forward movements are respectively imparted to the carrier as described.

5. In a molding or pressing machine, a mold or die, a carrier therefor, an operating-shaft, an inner eccentric affixed to the shaft, an outer eccentric mounted to turn on the inner eccentric said outer eccentric being expansible, a clutch member surrounding the outer eccentric connections between the clutch member and the carrier, and means operated by the rotation of the shaft for rotating the outer eccentric relatively to the clutch member, and by resistance to the movement of the carrier for expanding the outer eccentric into locking engagement with the clutch member, whereby yielding and positive forward movements are respectively imparted to the carrier as described.

6. In a molding or pressing machine, a mold or die, a carrier therefor, an operating-shaft, an inner eccentric and a cam affixed to the shaft, an expansible outer eccentric rotatable on the inner eccentric, a clutch member surrounding the outer eccentric and connected with the carrier, yielding means for imparting motion from the cam to the outer eccentric to rotate the latter and thereby yieldingly move the carrier, said means including a lever pivoted to the outer eccentric and displaceable by the cam when the movement of the carrier is opposed, and means operated by the displacement of said lever for expanding the outer eccentric into locking engagement with the said clutch member, whereby yielding and positive forward movements are respectively imparted to the carrier as described.

7. In a molding or pressing machine, a mold or die, a carrier therefor, an operating-shaft, an inner eccentric and a cam affixed to the shaft, an expansible outer eccentric rotatable on the inner eccentric, a clutch member surrounding the outer eccentric and connected with the carrier, a lever pivoted to the outer eccentric, a spring interposed between one arm of the lever and the outer eccentric, said spring holding the other arm of the lever in yielding engagement with the cam, the lever being displaceable by the cam when movement of the carrier is opposed, and a device operated by the displacement of the lever to expand the outer eccentric into locking engagement with the clutch member, whereby yielding and positive forward movements are respectively imparted to the carrier as described.

8. In a counter-molding machine, a male mold, a sectional female mold, means for changing the relative longitudinal positions of said parts, hinged oblique guides engaged with the inner ends of the female-mold sections, hinge members on said sections adapted to be engaged by inward movements of the sections on said guides, means operated by a forward movement of one of the molds for moving the sections inwardly on said guides, and means for yieldingly moving the sections outwardly on the guides.

9. In a counter-molding machine, a female mold composed of sections having separable hinge members, hinged oblique guides engaged with the inner ends of the female-mold sections, and means including springs and stops for normally holding said guides yieldingly in position to guide the sections until their hinge members are engaged, the said springs then permitting the guides and mold-sections to swing in unison toward the male mold.

10. In a counter-molding machine, a male mold, a sectional female mold, means for changing the relative longitudinal positions of said parts, hinged oblique guides engaged with the inner ends of the female-mold sections, and hinged spring-pressed bearing-pieces at opposite sides of the male mold yieldingly engaging the outer ends of the female-mold sections.

11. In a counter-molding machine, a male mold having rigid spurs on its side portions for engaging the side portions of a counter, and an ejector movable over the male mold in a path to engage the counter and to disengage it from said spurs.

12. In a counter-molding machine a male mold having means for engaging the side portions of a counter, and an ejecting-finger movable over the mold and having a projection formed to separate the ends of a counter on said mold.

13. In a counter-molding machine, a male mold, a female mold, means for changing the relative longitudinal positions of said parts, a carrier having means for engaging a blank, and means for moving said carrier from a receiving position to a position over the molds, the carrier being loosely movable longitudinally whereby the carrier will follow the movements of the blank in the molds.

14. In a counter-molding machine, a male mold, a female mold, means for changing the relative longitudinal positions of said parts, a blank-carrier, and means for moving said carrier from a receiving position to a presenting position, the said carrier having counter-engaging members which are loosely movable laterally or crosswise whereby the counter-engaging members will follow the movements of portions of the blank projecting from the molds.

15. In a counter-molding machine, a male mold, a female mold, means for changing the relative longitudinal positions of said parts, a carrier having means for engaging a blank, and carrier-operating mechanism having provisions for permitting a loose longitudinal movement of the carrier whereby the counter-engaging members will follow the movements of portions of the blank projecting from the molds.

16. A molding or pressing machine comprising in its construction relatively movable molds, and a blank-carrier freely mounted relatively to said molds, whereby the said carrier may be moved through the medium of a counter held thereby, and acted upon by the molds.

17. In a counter-molding machine, the combination with relatively movable molds, of a carrier having counter-holding members mounted to swing freely toward and from each other on said carrier.

18. A blank-carrier comprising a plate or bed, and a pair of counter-engaging members pivotally connected therewith, each member having a blank-receiving throat, the sides of which are formed to bend the portion of the blank inserted in the throat.

19. A blank-carrier comprising a plate or bed, and a pair of counter-engaging members pivotally connected therewith, each member having opposed fingers separated by a blank-receiving throat and formed to bend the portion of the blank inserted in said throat.

20. A counter-blank carrier comprising a plate or bed, a pair of arms pivoted thereto, and a pair of counter-engaging members pivoted to said arms, each member having a blank-receiving throat.

21. In a counter-molding machine, a male mold, a female mold, means for changing the relative positions of said parts, a flange-former, a carrier having means for engaging a blank, and means for moving said carrier from a receiving position to a presenting position, the carrier being loosely movable longitudinally whereby the counter-engaging members will follow the movements of portions of the blank projecting from the molds.

22. In a counter-molding machine, the combination with relatively movable molds, of a carrier, a support therefor, said carrier being mounted to freely reciprocate relatively to its support when adjacent to the molds, whereby a counter supplied by said carrier may be engaged by a movable mold, and the carrier shifted by a movement imparted thereto by the counter, said carrier having counter-holding fingers freely movable toward and from each other.

23. A counter-molding machine comprising relatively movable molds, a counter-carrier, a support therefor, said carrier being mounted to freely reciprocate relatively to its support when the counter carried thereby is taken by the molds, and counter-holders yieldingly mounted upon the carrier so as to yield when the sides of the counters are pressed in by the mold.

24. In a counter-molding machine, a male mold having means for retaining a molded counter in engagement therewith, and an ejector movable over the male mold in a path longitudinally thereof to engage the counter and disengage it from the mold.

In testimony whereof I have affixed my signature in presence of two witnesses.

WILLIAM C. STEWART.

Witnesses:
C. F. BROWN
E. BATCHELDER.